United States Patent
Hokoi et al.

(10) Patent No.: US 9,643,589 B2
(45) Date of Patent: May 9, 2017

(54) VEHICULAR INFORMATION PROCESSING DEVICE

(71) Applicant: TOYOTA JIDOSHA KABUSHIKI KAISHA, Toyota-shi, Aichi-ken (JP)

(72) Inventors: Koji Hokoi, Toyota (JP); Keisuke Morisaki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/877,400

(22) Filed: Oct. 7, 2015

(65) Prior Publication Data

US 2016/0137184 A1    May 19, 2016

(30) Foreign Application Priority Data

Nov. 18, 2014   (JP) .................................. 2014-233400

(51) Int. Cl.
*B60W 10/06*   (2006.01)
*B60W 50/14*   (2012.01)
(Continued)

(52) U.S. Cl.
CPC ............ *B60W 10/06* (2013.01); *B60W 10/08* (2013.01); *B60W 10/26* (2013.01); *B60W 20/00* (2013.01);
(Continued)

(58) Field of Classification Search
CPC ...... B60W 10/06; B60W 10/08; B60W 10/26; B60W 20/40; B60W 50/082;
(Continued)

(56) References Cited

U.S. PATENT DOCUMENTS 5,778,326 A * 7/1998 Moroto ................. B60K 6/485
                                                    180/65.26
5,842,534 A * 12/1998 Frank ....................... B60K 6/48
                                                    180/65.25
(Continued)

FOREIGN PATENT DOCUMENTS

JP   2007-050888 A   3/2007
JP   2009-012605 A   1/2009
(Continued)

OTHER PUBLICATIONS

English translation of international application PCT/JP2012/055666 (original WO document published Sep. 12, 2013).*
(Continued)

*Primary Examiner* — Behrang Badii
*Assistant Examiner* — David Testardi
(74) *Attorney, Agent, or Firm* — Oliff PLC

(57) ABSTRACT

A vehicle in a first mode consumes a charge amount of a battery. The vehicle in a second mode maintains the charge amount of the battery. An obtaining circuitry obtains, as a first distance, a total distance for which the vehicle has traveled in the first mode. When the vehicle is assumed to have traveled with the first mode preferentially assigned to the travel route separately from the travel plan, an estimating circuitry estimates, as a second distance, a total distance for which the vehicle would have traveled in the first mode. A notifying circuitry notifies the first distance information and the second distance information.

8 Claims, 3 Drawing Sheets

(51) Int. Cl.
- *B60W 20/40* (2016.01)
- *B60W 10/08* (2006.01)
- *B60W 10/26* (2006.01)
- *B60W 50/00* (2006.01)
- *B60W 50/08* (2012.01)
- *B60W 20/00* (2016.01)

(52) U.S. Cl.
CPC ........ *B60W 20/40* (2013.01); *B60W 50/0097* (2013.01); *B60W 50/082* (2013.01); *B60W 50/14* (2013.01); *B60W 2550/14* (2013.01); *B60W 2550/402* (2013.01); *B60W 2710/06* (2013.01); *B60W 2710/08* (2013.01); *B60W 2710/244* (2013.01); *Y10S 903/93* (2013.01)

(58) Field of Classification Search
CPC ....... B60W 2550/14; B60W 2550/402; B60W 50/14; B60W 2050/146
See application file for complete search history.

(56) References Cited

U.S. PATENT DOCUMENTS

| | | | | |
|---|---|---|---|---|
| 7,013,205 | B1* | 3/2006 | Hafner | B60L 11/126 180/165 |
| 8,761,981 | B2* | 6/2014 | Hussain | B60W 20/00 180/65.265 |
| 2001/0039230 | A1* | 11/2001 | Severinsky | B60H 1/004 477/3 |
| 2002/0188387 | A1* | 12/2002 | Woestman | B60K 6/365 701/22 |
| 2009/0030568 | A1* | 1/2009 | Amano | B60K 6/445 701/22 |
| 2009/0277704 | A1* | 11/2009 | Yamaguchi | B60K 6/26 180/65.31 |
| 2009/0322503 | A1* | 12/2009 | Suzuki | B60K 6/365 340/438 |
| 2009/0326750 | A1* | 12/2009 | Ang | B60K 6/365 701/22 |
| 2010/0010697 | A1* | 1/2010 | Soma | B60K 6/445 701/22 |
| 2010/0152937 | A1* | 6/2010 | Yamada | B60K 6/46 701/22 |
| 2010/0152939 | A1* | 6/2010 | Yamada | B60K 6/46 701/22 |
| 2010/0168944 | A1* | 7/2010 | Otake | B60K 6/365 701/22 |
| 2010/0305799 | A1* | 12/2010 | Yamada | B60K 6/46 701/22 |
| 2011/0022255 | A1* | 1/2011 | Yamada | B60K 6/46 701/22 |
| 2011/0060493 | A1* | 3/2011 | Miura | G01C 21/00 701/31.4 |
| 2011/0184600 | A1* | 7/2011 | Kristinsson | G01C 21/3469 701/22 |
| 2012/0116606 | A1* | 5/2012 | Ichinokawa | B60K 35/00 701/1 |
| 2013/0018538 | A1* | 1/2013 | Miura | B60R 16/0236 701/22 |
| 2013/0066552 | A1* | 3/2013 | Hamilton, II | G06Q 10/047 701/527 |
| 2013/0241485 | A1* | 9/2013 | Snyder | B60W 20/11 320/109 |
| 2015/0066270 | A1* | 3/2015 | Ogawa | B60W 20/00 701/22 |
| 2015/0066271 | A1* | 3/2015 | Ogawa | B60L 7/14 701/22 |

FOREIGN PATENT DOCUMENTS

| | | | |
|---|---|---|---|
| JP | 2011057116 A | * | 3/2011 |
| JP | 2011057117 A | * | 3/2011 |
| JP | 2012057982 A | * | 3/2012 |
| JP | 2013119349 A | * | 6/2013 |
| JP | 2014-028615 A | | 2/2014 |
| WO | WO 2013/132593 A1 | * | 9/2013 |
| WO | WO 2013/132640 A1 | * | 9/2013 |

OTHER PUBLICATIONS

Dec. 20, 2016 Office Action issued in Japanese Patent Application No. 2014-233400.

* cited by examiner

Fig.4
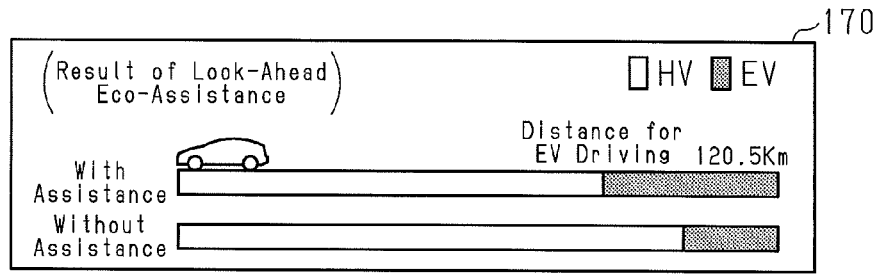
Fig.5
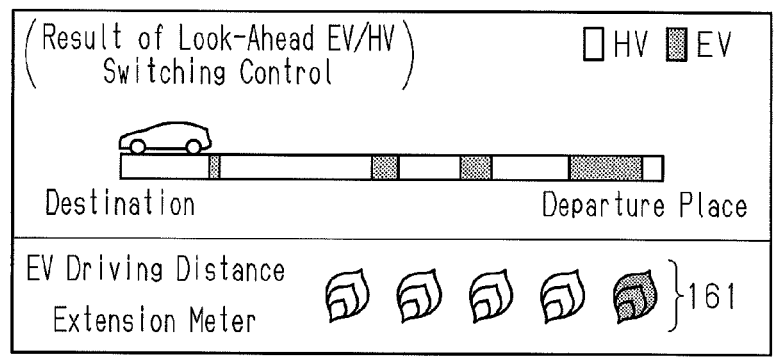
Fig.6
| Leaf Meter Display | Level |
|---|---|
| − − − − − | Level 0 |
| 🍃🍃🍃🍃🍃 | Level 1 |
| 🍃🍃🍃🍃🍃 | Level 2 |
| 🍃🍃🍃🍃🍃 | Level 3 |
| 🍃🍃🍃🍃🍃 | Level 4 |
| 🍃🍃🍃🍃🍃 | Level 5 |

VEHICULAR INFORMATION PROCESSING DEVICE

BACKGROUND OF THE DISCLOSURE

The present disclosure relates to a vehicular information processing device that processes information regarding application of a plurality of driving modes of a vehicle.

Conventionally, vehicles that use an internal combustion engine and a motor as drive sources have been widely known. Such vehicles include plug-in hybrid vehicles. Such a vehicle has, as driving modes, a CD mode (first mode), in which the charge amount of the battery is consumed, and a CS mode (second mode), in which the battery charge amount is maintained. In the CD mode, for example, priority is given to EV driving, in which the engine is stopped and only the motor is used. That is, use of the engine is restrained or prohibited. In the CS mode, priority is given to HV driving, in which at least one of the engine and the motor is used as necessary to maintain the charge amount of the battery.

In recent years, vehicular information processing devices have been proposed that calculates a travel route from a departure place to a destination and assigns, as a vehicle driving mode, the first mode or the second mode to each of the sections in the calculated travel route. For example, Japanese Laid-Open Patent Publication No. 2009-12605 discloses one example of the vehicular control device that has such an information processing function for a vehicle.

The device of Japanese Laid-Open Patent Publication No. 2009-12605 applies the second mode as the mode for the section of the highest average vehicle speed among the sections in a travel route and applies the first mode as the mode for the remaining sections. The device also calculates a prediction value of the remaining battery level of the vehicle when the vehicle will have traveled from the current position to the destination with the applied modes. If the calculated prediction value is less than the lower limit value, which corresponds to depletion of the battery, the device changes the mode of the section of the second highest average vehicle speed from the first mode to the second mode and then re-calculates the prediction value of the remaining battery level at the destination. Thereafter, until the prediction value of the remaining battery level of the vehicle at the destination reaches the vicinity of the lower limit value, the device successively changes the mode of the section of the next highest average vehicle speed from the first mode to the second mode. When the prediction value of the remaining battery level at the destination reaches the vicinity of the lower limit value, the device makes a plan using the modes applied to the respective sections.

To improve the fuel efficiency, the device of Japanese Laid-Open Patent Publication No. 2009-12605 plans assignment of the modes to consume the battery by actively employing the motor to drive the vehicle in sections suitable for the EV driving in the travel route from the departure place to the destination. However, depending on the travel route, such planned assignment of the modes will not necessarily improve the fuel efficiency, that is, will not necessarily extend the distance for EV driving, as expected. Further, the conventional device cannot even notify the user of the effect of such extension of the distance for EV driving.

Accordingly, it is an objective of the present disclosure to provide a vehicular information processing device that is capable of notifying a user of the actual magnitude of a result of extension of the distance for EV driving achieved through a travel plan.

SUMMARY

In accordance with one aspect of the present disclosure, a vehicular information processing device, which processes information of a vehicle, is provided. The vehicle selects one of a first mode and a second mode and travels. The first mode restrains or prohibits operation of an internal combustion engine, while prioritizing operation of a motor, which consumes a charge amount of a battery. The second mode activates at least one of the engine and the motor to maintain the charge amount of the battery. A travel route from a departure place to a destination includes a plurality of sections. A travel plan assigns one of the first mode and the second mode to each of the sections based on a road load of each section. The vehicular information processing device includes an obtaining circuitry, an estimating circuitry, and a notifying circuitry. The obtaining circuitry obtains, as a first distance, a total distance for which the vehicle has traveled in the first mode based on a result of traveling of the vehicle according to the travel plan. When the vehicle is assumed to have traveled with the first mode preferentially assigned to the travel route separately from the travel plan, the estimating circuitry estimates, as the second distance, a total distance for which the vehicle would have traveled in the first mode. The notifying circuitry notifies information corresponding to the first distance and information corresponding to the second distance.

According to such a configuration, by providing the information corresponding to the first distance and the information corresponding to the second distance, as compared to the case without any travel plan, the user is notified of the actual magnitude of the result of extension of the distance for which the vehicle has been able to travel in the first mode, which may be regarded as EV driving due to the traveling according to the travel plan. In actual traveling, even if the vehicle travels according to the travel plan, the distance for which the vehicle is able to travel in the first mode may not be necessarily extended as planned, and the user is also notified of such actual magnitude. As such notification is made after the vehicle has traveled, the user is provided with material for determination with the advantage of having the vehicle travel according to the travel plan in this travel route in the future.

The obtaining circuitry preferably obtains, as the first distance, a total distance for which the vehicle has traveled only by the motor for sections to which the first mode is assigned by the travel plan.

According to such a configuration, by obtaining the actual distance for EV driving in the first mode, the result of extension of the distance for which the vehicle has traveled only by the motor may be notified at higher accuracy.

The obtaining circuitry preferably obtains a distance for which the vehicle has traveled only by the motor for sections to which the second mode is assigned by the travel plan, and obtains a total distance of the obtained distance added to the first distance as a newly obtained first distance.

According to such a configuration, for all sections in the travel route including the sections other than the section to which the first mode is assigned by the travel plan, it is possible to obtain the actual magnitude of the distance extended based on at least one of the distances for which the vehicle has been able to travel in the first mode and only by the motor. Accordingly, the actual magnitude of the result of extension of the distance for which the vehicle has traveled in the first mode or only by the motor may be notified at higher accuracy.

The notifying circuitry preferably displays the first distance and the second distance side by side.

According to such a configuration, displaying the first distance and the second distance side by side facilitates comparison between the first distance and the second distance, and thus the effect of extension of the distance for which the vehicle has been able to travel in the first mode based on the driving assistance becomes clearer. By displaying the two distances side by side by charts or values, for example, it is possible to easily recognize the difference between the two distances.

The notifying circuitry preferably notifies a difference between the first distance and the second distance.

According to such a configuration, the difference between the first distance and the second distance allows clearer notification of the effect of extension of the distance for which the vehicle has been able to travel in the first mode based on the driving assistance.

The notifying circuitry preferably divides a range within which the difference varies into a plurality of levels and notifies the difference based on the levels.

According to such a configuration, by notifying the difference based on the plurality of separate levels, the effect of extension of the distance for which the vehicle has been able to travel in the first mode may be easily and reliably recognized.

The notifying circuitry preferably determines weighting for each of the levels, and determines a range for each level based on the weighting.

According to such a configuration, it is possible to improve the user's recognition of the effect of extension of the distance for which the vehicle has been able to travel in the first mode differently appears due to road conditions of the travel route and the remaining battery level.

The notifying circuitry preferably changes the weighting according to at least one of a state of charge of the battery, a driving environment of the vehicle, a driving state of the vehicle, and a condition of the vehicle.

According to such a configuration, circumstances that may easily influence the effect of extension of the distance for which the vehicle has been able to travel in the first mode are considered, and the effect of extension of the distance for which the vehicle has been able to travel in the first mode may be notified more appropriately.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 4 is a screen of the vehicular information processing device of FIG. 1, graphically showing a first distance when a vehicle travels with assistance according to a travel plan, and a second distance without any assistance or a travel plan;

FIG. 5 is a screen of a vehicular information processing device according to a second embodiment displayed when the difference between the first distance and the second distance is shown by a level; and FIG. 6 is a pattern table showing an example of display in the screen of FIG. 5, when the difference between the first distance and the second distance is shown by a level.

DESCRIPTION OF THE PREFERRED EMBODIMENTS

Figure 1:
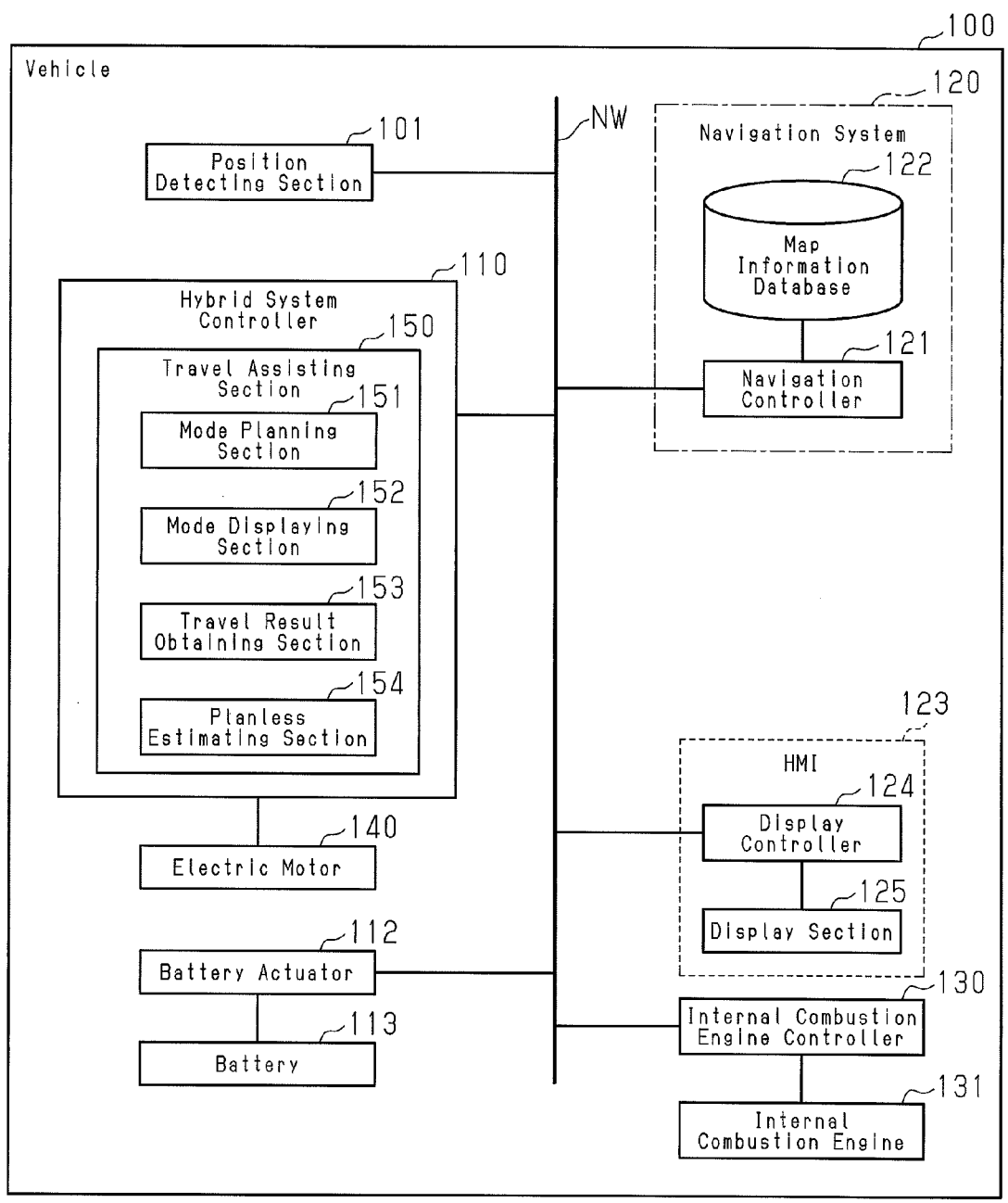
FIG. 1 is a block diagram schematically showing a vehicular information processing device according to a first embodiment of the present disclosure.

A vehicular information processing device according to a first embodiment will now be described with reference to FIGS. 1 to 4. The vehicular information processing device of the present embodiment is mounted on a plug-in hybrid vehicle 100, which has an internal combustion engine 131 and an electric motor 140 as drive sources, and outputs driving assistance information.

The outline of the vehicle 100, which is equipped with the vehicular information processing device, will now be described.

The vehicle 100 has two driving modes. One of the modes is a charge depleting (CD) mode, which is a first mode and consumes the charge amount of a battery 113. The other mode is a charge sustaining (CS) mode, which is a second mode and maintains the charge amount of a battery 113. In the CD mode, for example, priority is given to EV driving, in which the engine 131 is stopped and only the motor 140 is used, so that use of the engine 131 is restrained to consume the charge amount of the battery 113. It is assumed that there is no large difference even if the traveling in the CD mode is regarded as EV driving, and the travel distance in the CD mode is considered to substantially be the distance in EV driving. In the CS mode, priority is given to HV driving, in which at least one of the engine 131 and the motor 140 is used to maintain the charge amount of the battery 113, so that the charge amount of the battery 113 is maintained. A navigation system 120 of the vehicle 100 sets a travel route from a departure place of the vehicle 100 to a destination when the destination is set. A travel assisting section 150, which is an assessing section of a hybrid system controller 110, assigns the CD mode or the CS mode to sections in the set travel route according to road loads of the respective sections, thereby making a travel plan. Normally, although varying in the magnitude, a travel plan achieves a certain fuel efficiency improvement and exhaust performance improvement in comparison to traveling not in accordance with a travel plan. The magnitudes of improvements are assessed to be greater as a distance for which EV driving is allowed in traveling in accordance with a travel plan becomes longer than a distance for which EV driving is allowed in traveling not in accordance with the travel plan. Also, the magnitudes of improvements that are assessed to be smaller as the distance for which EV driving is allowed during traveling with a travel plan becomes closer to the distance for which EV driving is allowed during traveling that is not in accordance with the travel plan. As a result of the vehicle 100 traveling according to the travel plan that has been planned, the travel assisting section 150 obtains the total distance for which the vehicle 100 has been able to travel in the CD mode as a first distance. Also, the travel assisting section 150 estimates, as a second distance, the total distance for which the vehicle 100 would have been able to travel in the CD mode, if the CD mode were assigned to a travel route in priority and the vehicle 100 traveled along the travel route not in accordance with the travel plan. After the vehicle 100 arrives at the destination, the travel assisting section 150 outputs the obtained first distance and the estimated second distance to a human machine interface (HMI) 123, which is a notifying section. The HMI 123 displays the first distance and the second distance on a display section 125 to notify the user (refer to FIG. 4). Such notification, that is, guiding notification allows the user to select whether or not to have the vehicle travel along the travel route in accordance with the travel plan. The travel assisting section 150 may be composed of variety of circuitry.

The detailed configuration of the present embodiment will now be described.

As shown in FIG. 1, the vehicle 100, on which the vehicular information processing device is mounted, includes a position detecting section 101 as an element for obtaining information regarding the state of the vehicle 100. Such elements are connected to various types of controllers such as an engine controller 130, the hybrid system controller 110, a navigation controller 121, and a display controller 124 via an on-vehicle network NW such as a control area network (CAN). The engine controller 130 controls operation of the engine 131, and the hybrid system controller 110 controls operation of the motor 140. The controllers are electronic control units (ECU) each including a small computer having a calculator and a memory. The controllers are capable of performing various types of control through calculations by the calculators using the programs and parameters stored in the memories. The display controller 124 may be composed of variety of circuitry.

The position detecting section 101 detects the current position of the vehicle 100. The position detecting section 101 includes, for example, a global positioning system (GPS). The GPS receives GPS satellite signals and identifies the current position of the vehicle 100 based on the received GPS satellite signals. The position detecting section 101 outputs information indicating the identified current position, which is, for example, information including the latitude and longitude. In addition to or in place of GPS satellite signals, the position detecting section 101 may use other satellite signals or road-to-vehicle communication to detect the current position of the vehicle 100.

The vehicle 100 includes a navigation system 120, which guides travel routes of the vehicle 100. The navigation system 120 includes a map information database 122, which stores map information, and the navigation controller 121, which uses the map information stored in the map information database 122 to execute guiding process of travel routes of the vehicle 100.

The map information stored in the map information database 122 includes node information related to nodes, which represent positions on roads, and link information related to links, each of which connects adjacent two nodes. The node information includes positional information of nodes and road information at positions of the nodes. The link information includes road information at the positions of links. The road information included in the link information includes information representing the road load when the vehicle 100 travels through the links. In this case, the road load is defined based on the moving time, the moving speed, the consumed fuel amount, and the consumed electricity amount. The road load may be calculated based on factors such as information on the gradient of roads and the weight of the vehicle 100.

The navigation controller 121 obtains information representing the current position of the vehicle 100 from the position detecting section 101. When the user sets a destination, the navigation controller 121 searches for a travel route from a departure place of the vehicle 100 to the destination by referencing the map information database 122 and using, for example, Dijkstra's algorithm. Normally, the departure place of the vehicle 100 is the same as the current position of the vehicle 100, but may be set as a different place. The navigation controller 121 outputs, to the hybrid system controller 110 via the on-vehicle network NW, the information of all the links included in the searched travel route together with the information of the road loads included in the link information.

The vehicle 100 also includes a battery 113, which is a power source of the motor 140, and a battery actuator 112, which controls charging/discharging of the battery 113. The battery 113 can be charged by a power source located outside the vehicle, which is connected to an inlet (not shown) via the battery actuator 112. The battery actuator 112 is connected to various types of controllers such as the engine controller 130, the hybrid system controller 110, the navigation controller 121, and the display controller 124 via the on-vehicle network NW.

The hybrid system controller 110 has a function of determining the drive force distribution (output ratio) of the engine 131 and the motor 140 at each moment. The hybrid system controller 110 has a function of performing driving assistance based on the travel route and a function of causing the vehicle 100 to travel in assigned driving modes in respective sections during traveling.

Specifically, the hybrid system controller 110 determines the drive force distribution based on the detection results of an acceleration sensor, a vehicle speed sensor, and an accelerator sensor (none of which is shown). Based on the drive force distribution, the hybrid system controller 110 generates a control command for the battery actuator 112 related to discharging of the battery 113 and information regarding the control amount of the engine 131 to be calculated by the engine controller 130. The hybrid system controller 110 determines the distribution of the braking force of the brake and the motor 140 based on the detection results of the acceleration sensor, the vehicle speed sensor, and the brake sensor. Based on the braking force distribution, the hybrid system controller 110 generates a control command for the battery actuator 112 related to charging of the battery 113 and information regarding the control amount of the brake to be calculated by the engine controller 130. The hybrid system controller 110 outputs the generated control command to the battery actuator 112 to control charging/discharging of the battery 113. Accordingly, the motor 140, which uses the battery 113 as the power source, is driven by discharge of the battery 113, or the battery 113 is charged through regeneration of the motor 140.

The hybrid system controller 110 includes the travel assisting section 150. When inputting a travel route of the vehicle 100 from the navigation controller 121, the travel assisting section 150 outputs driving assistance information in response to the input travel route. The travel assisting section 150 includes a mode planning section 151, which makes a travel plan, in which either the CD mode or the CS mode is assigned to each of the links included in the travel route input from the navigation controller 121. The unit to which either CD mode or the CS mode is assigned does not necessarily need to be the link as long as the selected unit divides a travel route into sections that correspond to the road load.

Figure 2:
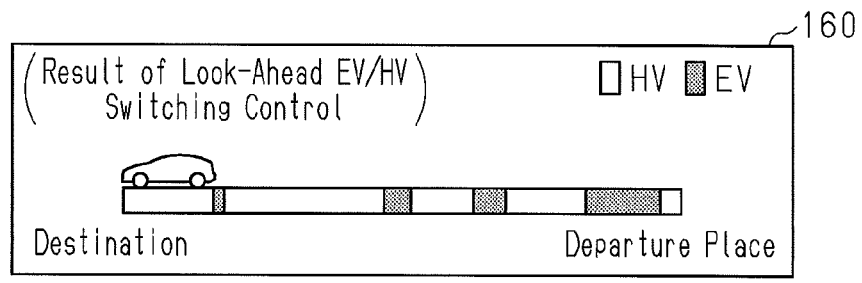
FIG. 2 is a screen showing an example of display of a travel result in the vehicular information processing device of FIG. 1 when a vehicle travels according to a travel plan.

FIG. 2 is a screen showing, as an example of display of a travel result according to a travel plan, how a result of look-ahead EV/HV switching control is displayed in a display screen 160 of the display section 125. A travel plan before traveling will be described with reference to the result of look-ahead EV/HV switching control in FIG. 2, for purposes of illustration. Normally, how the EV/HV mode assigned according to the travel plan before traveling is displayed does not have any substantial difference from how the EV/HV mode is displayed as a travel result based on a travel plan.

As shown in FIG. 2, in a travel plan, consecutive links to which the same mode is assigned are shown as one section, for purposes of illustration. Thus, the travel plan of FIG. 2 from a departure place to destination has nine sections in a travel route. In this travel plan, four sections, to which the CD mode is assigned, are labeled as EV (shaded sections in FIG. 2), and five sections, to which the CS mode is assigned, are labeled as HV (blank sections in FIG. 2). EV indicates the EV mode, which corresponds to the CD mode. HV indicates the HV mode, which corresponds to the CS mode.

Specifically, the CD mode is designed to actively consume the electricity stored in the battery 113 without maintaining the charge amount and to activate the motor 140 to prioritize traveling by the motor 140. In the CD mode, the operation of the engine 131 is suppressed. However, when the accelerator pedal is depressed greatly and an increased travel power is required, the engine 131 is activated to consume fuel.

The CS mode is designed to maintain the charge amount of the battery 113 in a predetermined range in relation to a reference value and to activate the engine 131 as necessary to cause the motor 140 to perform regeneration, thereby maintaining the charge amount of the battery 113. Even in the CS mode, the motor 140 is activated and the engine 131 is stopped when the charge amount of the battery 113 exceeds the reference value. In this case, the reference value of the CS mode is set, as necessary, to a value of the charge amount of the battery 113 at the time when the CD mode is changed to the CS mode or to a value of the charge amount of the battery 113 for maintaining performance of the battery 113.

That is, the CS mode is designed to maintain the amount of charge of the battery 113 while using the engine 131, and the CD mode is designed to prioritize consumption of the charge amount of the battery 113.

In either mode, the drive force distribution (output ratio) of the engine 131 and the motor 140 at each moment is determined by the hybrid system controller 110 to deal with the ever-changing road load. In accordance with the determined drive force distribution, at least one of the engine 131 and the motor 140 is driven as necessary in some cases.

The travel assisting section 150 includes a travel result obtaining section 153, which obtains the first distance as the total distance for which the vehicle 100 has been able to travel in the CD mode in traveling according to the travel plan. The travel assisting section 150 also includes a planless estimating section 154, which estimates the second distance as the total distance for which the CD mode is assumed to be assigned, when there is no travel plan and the CD mode is assigned to the travel route in priority.

Further, the travel assisting section 150 includes a mode displaying section 152, which outputs, to the HMI 123, the travel plan made by the mode planning section 151 as driving assistance information via the on-vehicle network NW. The mode displaying section 152 outputs information regarding the first distance obtained by the travel result obtaining section 153 after traveling along the travel route and arriving at the destination, as well as information regarding the second distance estimated by the planless estimating section 154. The mode displaying section 152 outputs information for displaying images at the HMI 123. In place of or in addition to this, the mode displaying section 152 may output speech information.

The HMI 123 includes the display section 125, which is capable of displaying characters and images, and a display controller 124, which generates images or the like corresponding to the first distance and the second distance, which have been input and displays the generated images or the like in the display section 125. The display section 125 is configured for example by at least one of a monitor, a head-up display, and a meter panel. The display section 125 may commonly use a monitor of the navigation system 120.

As shown in FIG. 4, when the information regarding the first distance and the second distance is input from the travel assisting section 150, the display controller 124 displays a meter image 170 in the display section 125. The meter image 170 includes a graph "with assistance" including the first distance and a graph "without assistance" including the second distance. The display controller 124 displays the information input from the travel assisting section 150 as an image. However, either along with this or in place of this, the information may be output as sound through a loudspeaker.

Next, an example of operation of the present embodiment will be described. Specifically, drive assisting process executed by the travel assisting section 150 will be described.

When a destination is set in the navigation system 120 and a travel route to the destination is searched for, information regarding the travel route from the departure place to the destination is input to the travel assisting section 150 from the navigation controller 121.

As the travel assisting section 150 obtains the travel route, the mode planning section 151 makes a travel plan by assigning either the CD mode or the CS mode to each link in the obtained travel route based on a road load of each link. In order to extend the distance for EV driving along the travel route, the mode planning section 151 plans a travel plan such that the plan meets conditions for the purpose. Normally, if the CD mode is assigned and the EV driving is preferentially performed, fuel consumption is reduced, and the fuel efficiency and the exhaust performance are improved. In this case, the distance to which the CD mode can be assigned is restricted by the charge amount of the battery 113. Accordingly, by making a travel plan, the CD mode is assigned to as many sections as possible, and the CS mode is assigned to sections to which the CD mode cannot be assigned. Specifically, the mode planning section 151 assigns the CD mode to sections of relatively low road loads and assigns the CS mode to sections of relatively high road loads. Whether the road load of each section is high or low is determined in relation to the other sections in the travel route. Thus, the road load of each section is determined by being compared to the road loads of all the other sections in the travel route. In a travel plan, sections in an urban area, in which the average vehicle speed is low, are defined as sections of low road loads, and sections on a highway, on which the average vehicle speed is high, are defined as sections of high road loads. As long as conditions for extending the distance for EV driving are met, a travel plan may be made according to other known conditions.

Once a travel plan is made, the hybrid system controller 110 controls traveling of the vehicle 100 to travel the sections in the travel route either in the CD mode or in the CS mode determined by the travel plan. When traveling according to the travel plan, the travel result obtaining section 153 accumulates (sums) the travel distance in the sections for which the vehicle has been able to travel in the CD mode. A process for accumulating the distance in the sections for which the vehicle has been able to travel in the CD mode is continuously performed during the travel along the travel route from the departure place to the destination. Thus, arrival of the vehicle 100 at the destination finalizes the first distance in traveling according to the travel plan.

The planless estimating section 154 estimates the second distance. Specifically, the planless estimating section 154; (i) accumulates the distance immediately before accumulation of the road load of the vehicle 100 from the departure place exceeds a value corresponding to a charged amount of the battery 113 at the departure place, and (ii) estimates the accumulated distance as the second distance for which the vehicle 100 is able to travel in the CD mode. A process for estimating the second distance is also continuously performed during the travel from the departure place to the destination.

Figure 3:
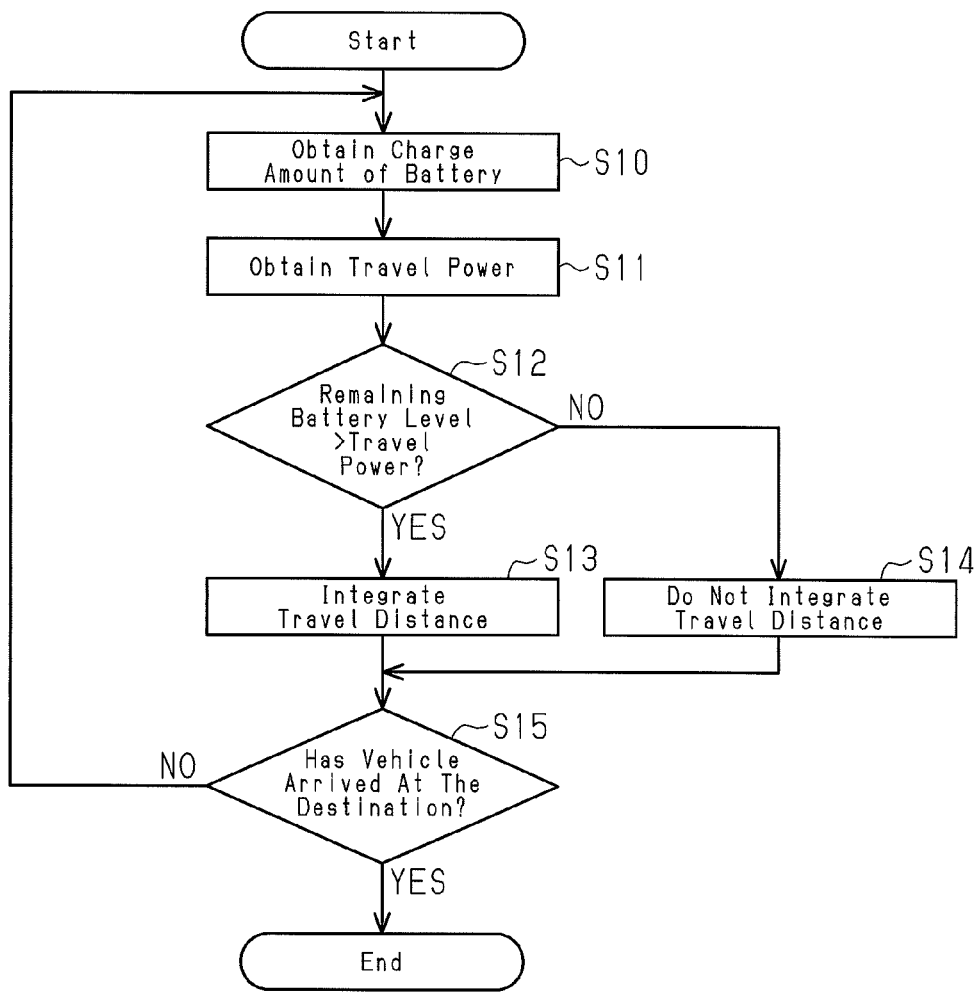
FIG. 3 is a flowchart showing a process of estimating a distance when a vehicle travels in a CD mode without a travel plan by the vehicular information processing device of FIG. 1.

The process for estimating the second distance will be described with reference to FIG. 3. As shown in FIG. 3, as the process for estimating the second distance is started, the planless estimating section 154 obtains a charge amount of the battery 113 at this time point as a remaining battery level (Step S10 in FIG. 3). The planless estimating section 154 obtains travel power required for the vehicle 100 (Step S11 in FIG. 3). The travel power is a so-called road load that is obtained as a value, which can be compared with the charged amount of the battery 113 (e.g., a quantity of electricity). The travel power is obtained as a value of accumulation of the travel power that is sequentially calculated by the hybrid system controller 110 from the previous process of obtaining the travel power to the current process of obtaining the travel power. In the first process of obtaining the travel power, the travel power is obtained as a value of accumulation of the travel power from the departure place.

The planless estimating section 154 determines whether or not the obtained remaining battery level is greater than the travel power (Step S12 in FIG. 3). If the obtained remaining battery level is determined to be greater than the travel power (YES in Step S12 in FIG. 3), the planless estimating section 154 integrates: (i) the total estimated distance for which the vehicle would have traveled in the CD mode, with (ii) the distance of the section corresponding to the travel power obtained in Step S11 (Step S13 in FIG. 3). Then, the process moves to Step S15.

In contrast, if the obtained remaining battery level is determined to be no greater than the travel power (equal to or smaller than the travel power) (NO in Step S12 in FIG. 3), the planless estimating section 154 does not integrate the total estimated distance for which the vehicle would have traveled in the CD mode with the distance of the section corresponding to the travel power obtained in Step S11 (Step S14 in FIG. 3). Then, the process moves to Step S15.

The planless estimating section 154 determines whether or not the vehicle has arrived at the destination (Step S15 in FIG. 3). If it is determined that the vehicle has not arrived at the destination (NO in Step S15 in FIG. 3), the planless estimating section 154 has the process return to Step S10 at a predetermined interval, and the above process following Step S10 is executed. In contrast, if it is determined that the vehicle has arrived at the destination (YES in Step S15 in FIG. 3), the planless estimating section 154 terminates the process for estimating the distance for which the vehicle has traveled in the CD mode. Thus, the process for estimating the second distance is terminated.

After the vehicle 100 arrives at the destination, the travel assisting section 150 outputs, to the HMI 123, the information regarding the sections in which the vehicle was able to travel in the CD mode and the sections in which the vehicle traveled in the CS mode in the travel route. Further, the travel assisting section 150 outputs, to the HMI 123, the first distance obtained by the travel result obtaining section 153 and the second distance estimated by the planless estimating section 154.

As shown in FIG. 2, based on the travel result, the display controller 124 of the HMI 123 displays the result of the look-ahead EV/HV switching control in the display section 125 as the display screen 160. As described above, in the result of the look-ahead EV/HV switching control, the sections out of the travel route in which the vehicle was able to travel in the CD mode are labeled as EV (shaded sections in FIG. 2), and the sections out of the travel route in which the vehicle traveled in the CS mode are labeled as HV (blank sections in FIG. 2).

As shown in FIG. 4, the display controller 124 shows, in the display section 125, the meter image 170 showing a result of look-ahead eco-assistance by horizontal bar charts respectively indicating proportions of the first distance and the second distance in the travel route. In FIG. 4, the upper bar chart is a chart "with assistance," showing the proportion of the traveling in the CD mode and the traveling in the CS mode according to the travel plan along the length of the chart. In FIG. 4, the bar chart under the chart "with assistance" is a chart "without assistance," showing the proportion of the traveling in the CD mode and the traveling in the CS mode not according to the travel plan along the length of the chart. The display controller 124 displays the length corresponding to the first distance in the travel route on the right side of the bar chart "with assistance," and the length corresponding to the second distance in the travel route on the right side of the bar chart "without assistance.". As in FIG. 2, the proportion of the traveling in the CD mode is labeled as EV (shaded in FIG. 4), and the proportion of the traveling in the CS mode is labeled as HV (blank in FIG. 4). The entire length of each chart corresponds to the entire length of the travel route, in which the proportion of the first distance or the second distance is shown on the right side, and the proportion of the traveling in the CS mode is shown on the left side. The chart "with assistance" and the chart "without assistance" are shown one above the other such that horizontal positions of the departure place and the destination come at the same positions. Displaying the chart "with assistance" and the chart "without assistance" one above the other facilitates comparison between the lengths of the proportion of the first distance and the proportion of the second distance in the travel route.

Such display is able to make guiding notification to the user in various manners allowing comparison of distances for EV driving according to the travel plan. Such information also improves reliability in suitable assignment of the CD mode to the travel route according to the travel plan. In addition, by notifying the travel result according to the travel plan, that is, making the guiding notification, it is possible to leave, to the user, selection on whether or not the vehicle 100 is to travel according to the travel plan in the travel along the travel route in the future.

The vehicular information processing device according to the present embodiment achieves the following advantages.

(1) By notifying the information corresponding to the first distance and the information corresponding to the second distance, as compared to the case without any travel plan, the user is notified of the actual magnitude of the result of extension of the distance for which the vehicle has been able to travel in the CD mode based on the traveling according to the travel plan. In actual traveling, even if the vehicle travels according to the travel plan, the distance for which the vehicle is able to travel in the CD mode may not be necessarily extended as planned, and the user is also notified of such actual magnitude. As such notification is made after the vehicle 100 has traveled, the user is provided with material for determination on an advantage of having the vehicle 100 travel according to the travel plan in this travel route in the future.

(2) By displaying the first distance and the second distance side by side, comparison between the first distance and the second distance is facilitated, and an effect of extension of the distance for EV driving with driving assistance becomes clearer. In particular, as shown in FIG. 4, if the two distances are notified side by side in charts or values, the difference therebetween may be easily recognized.

A vehicular information processing device according to a second embodiment will now be described with reference to FIGS. 5 and 6.

The present embodiment is the same as the first embodiment except that the difference between the first distance and the second distance is shown by a plurality of separate levels. Thus, the following mainly describes the difference from the first embodiment.

As in the first embodiment, the travel assisting section 150 (see FIG. 1) outputs the travel result according to the travel route, the first distance obtained by the travel result obtaining section 153, and the second distance estimated by the planless estimating section 154 to the HMI 123 after the vehicle 100 arrives at the destination. As shown in FIG. 5, the display controller 124 of the HMI 123 displays the result of look-ahead EV/HV switching control in the display section 125. Specifically, in the present embodiment, the display controller 124 does not display the meter image 170 as shown in FIG. 4 in the display section 125.

In contrast, based on the first distance and the second distance input from the travel assisting section 150, the display controller 124 calculates, as an EV distance extension ratio, a proportion of the first distance to the second distance, which is a value based on the difference between the first distance and the second distance. The display controller 124 calculates five levels from "level 1" to "level 5" as a plurality of levels corresponding to the EV distance extension ratio. Among these levels, a higher level corresponds to a higher EV distance extension ratio. Specifically, the "level 1" corresponds to the lowest EV distance extension ratio, and the "level 5" corresponds to the highest EV distance extension ratio. For each level, a range of the corresponding EV distance extension ratio is determined. Threshold values separating the levels includes from a lower value, a lowest threshold value, a medium low threshold value, a medium high threshold value, and a highest threshold value. Specifically, the "level 1" is defined to be a range lower than the lowest threshold value, the "level 2" is defined to be a range no lower than the lowest threshold value and lower than the medium low threshold value, the "level 3" is defined to be a range no lower than the medium low threshold value and no higher than the medium high threshold value, the "level 4" is defined to be a range higher than the medium high threshold value and no higher than the highest threshold value, and the "level 5" is defined to be a range higher than the highest threshold value. Each of the four threshold values including the lowest threshold value, the medium low threshold value, the medium high threshold value, and the highest threshold value may be set such that intervals between adjacent two of the threshold values are the same, are divided into a plurality of different types, or are different. In any case, it is preferable that the intervals between the threshold values are set to values that can notify the user of the magnitude of the proportion in which the EV distance is extended in an easily recognizable manner. Accordingly, the range of the "level 2" may be set, for example, to be smaller than the range of the "level 3" and the range of the "level 4." The range of the "level 1" may include a proportion of "0%" or lower, or the range of the "level 5" may include a proportion of "100%" or higher. Such values are desirably set to be values that are determined based on experiences, experiments, or theories.

The display controller 124 selects a level corresponding to the calculated EV distance extension ratio from the "level 1" to the "level 5," and displays the selected level as an EV driving distance extension meter 161 in the display section 125.

The display section 125 displays the EV driving distance extension meter 161 in the following manner. For example, the EV driving distance extension meter 161 is displayed as a "leaf meter," in which five leaf-shaped patterns in different brightness are arranged in line, and the "leaf meter" indicates the level by the number of bright leaf patterns (blank in FIG. 5).

As shown in FIG. 6, for example, the "level 1" is displayed such that only one leaf pattern at an end of the meter is bright (blank in FIG. 6), and the remaining four leaf patterns are dark (shaded in FIG. 6). The "level 2" is displayed such that two leaf patterns from the end of the meter are bright, and the remaining three leaf patterns are dark. The "level 3" is displayed such that three leaf patterns from the end of the meter are bright, and the remaining two leaf patterns are dark. The "level 4" is displayed such that four leaf patterns from the end of the meter are bright, and the remaining one leaf pattern is dark. The "level 5" is displayed such that all of the five leaf patterns are bright. For purposes of illustration, when the EV distance extension ratio is not calculated, the level is set to the "level 0," the EV driving distance extension meter 161 is shown with a horizontal line, and the "leaf meter" is not displayed. Since displaying dark five leaf patterns may not allow distinction between the case in which the EV distance extension ratio is not calculated and the case in which the favorable EV distance extension ratio is not obtained, it is preferable that the "leaf meter" is not displayed when the level is set to the "level 0." Examples of the case in which the EV distance extension ratio is not calculated include a case in which the vehicle has not arrived at the destination yet, a case in which the vehicle has not traveled according to a travel plan, and a case in which the vehicle has traveled a place other than the road. The place other than the road is a place that is not included as the road in map information, and examples of which include river locations, sea coasts, private properties such as parking, and new constructed roads that are not identified as roads.

In addition to the advantage (1) of the first embodiment, the vehicular information processing device of the present embodiment, which has been described, achieves the following advantages.

(3) The effect of extension of the distance for EV driving by driving assistance is clearly displayed by the difference between the first distance and the second distance.

(4) By notifying the difference between the first distance and the second distance by separate five levels, the effect of extension of the distance for EV driving is easily and reliably recognized.

The above described embodiments may be modified as follows.

The second embodiment illustrates a case in which the threshold values are set to predetermined values. However, the threshold values may be altered statically or dynamically. For example, each value may be altered by weighting to the value before displaying the level after the arrival at the destination. The weighting may be set by an expression for calculating each threshold value, or by reflecting data for selecting the threshold value, or may be selected depending on conditions. As the threshold values are altered in this manner, the range of each level is also altered. Such alteration of the threshold values may be performed based on the remaining battery level as a state of charge of the battery. For example, when the distance for EV driving is extended to a certain distance, the extension ratio (proportion) to the distance for EV driving in full charge is largely different from the extension ratio (proportion) to the distance for EV driving when the remaining battery level is low. If the user is notified of at least one of the extension ratios as it is, there may be a gap from the sensation of the user. Therefore, the range of each level is made variable by alteration of each threshold value by the remaining battery level. For example, when the remaining battery level is low, the weighting may be increased to increase the threshold values to increase the range of each level. In contrast, when the remaining battery level is high, the weighting may be reduced to lower the threshold values to reduce the range of each level. Accordingly, it is possible to allow the user to recognize the effect of extension of the distance for EV driving (EV distance extension ratio) that is differently shown depending on the remaining battery level in more favorable manner.

The above modification illustrates a case in which the threshold values are altered based on the state of charge of the battery (the remaining battery level). However, the threshold values may be altered based on at least one of the state of charge of the battery, driving environments of the vehicle, driving states of the vehicle, and vehicle conditions of the vehicle. Examples of the vehicle conditions may include usage conditions of electrical components. Specifically, when an electrical component such as an air conditioner is used, the distance in which the vehicle travels in the CD mode or the distance for EV driving is reduced by the amount of power consumed by the electrical component. Therefore, the threshold values may be reduced to decrease the range of each level. Examples of such electrical components include lights such as headlights, an air conditioner, a fan, a disc player, a portable information terminal, and a mobile phone. By considering situations that may easily influence the effect of extension of the distance for EV driving when the threshold values are set in this manner, it is possible to notify the effect of extension of the distance for EV driving more appropriately. One example of the case in which alteration of the threshold values is favorable is that when the remaining battery level is low, the first half including a starting point of the travel route is uphill with a high road load, and the second half is downhill with a low road load. In this case, it is often the case in which the vehicle travels in the CS mode (HV driving) in the first half and the battery remains to some extent, and a travel distance in the CD mode (EV driving) in the second half, which is downhill with a low road load becomes longer than usual, and the extension ratio increases. Specifically, in this case, the user is provided with display information with which the extension ratio is appropriately evaluated by increasing the threshold values.

The second embodiment illustrates a case in which the EV distance extension ratio, as the proportion of the first distance to the second distance obtained based on the difference between the first distance and the second distance, is displayed by the level. However, the difference between the first distance and the second distance may be displayed corresponding to the level. At this time, it is preferable that the range of the level is variable according to an entire travel distance.

The second embodiment illustrates a case in which the range of each level is fixedly set to a predetermined range for each threshold value. However, each level may be variably set according to alteration of the threshold values that define the range of the level. For example, based on that the threshold values are altered according to weighting, the range of each level may also be altered by weighting.

The second embodiment illustrates a case in which the number of the levels is five. However, the number of the levels that separate the EV distance extension ratios may be more than five, or less than five.

The second embodiment illustrates a case in which the level is indicated by the number of the bright leaf patterns. However, as long as the plurality of levels can be distinguished, the level may be indicated by display other than the leaf patterns, such as values or charts. The indication is not limited to visual display, and may be sound guidance.

The first embodiment illustrates a case in which the bar chart "with assistance" and the bar chart "without assistance" are shown horizontally. However, as long as the user can compare the charts, the chart "with assistance" and the chart "without assistance" may be vertical charts, curves such as circular arcs, or pie charts. The charts may be shown alternately displayed in terms of time. This also allows display to be easily recognized by the user.

Each of the above embodiments illustrates a case in which a result of the distance for which the vehicle has been able to travel in the first mode is shown by a bar chart or an image of the "leaf meter." However, as long as the user is notified of the result of the distance for which the vehicle has been able to travel in the first mode in a recognizable manner, the indication may be by values, images, or sound guidance.

Each of the above embodiments illustrates a case in which when the second distance is estimated, the travel power is obtained as a value compared with a charged amount of the battery 113 (e.g., quantity of electricity). However, the remaining battery level may be converted to the road load to be compared with the travel power. For example, the remaining battery level may be converted to an output of the electric motor to be compared with the travel power.

Each of the above embodiments illustrates a case in which the second distance is estimated based on the travel power. However, for the calculation of the second distance, it is possible to consider, in addition to the travel power, energy loss due to inertia or the like and consumption by an electrical component mounted on the vehicle. Specifically, it is possible to subtract the energy loss and the consumed power, as well as the travel power, from the remaining battery level. The energy loss due to inertia may be calculated based on the speed in acceleration and deceleration. Accordingly, it is possible to allow more appropriate recognition of the extension of the EV distance.

Each of the above embodiments illustrates a case in which the first distance is the total distance for which the vehicle is able to travel in the CD mode. However, the first distance may be obtained by adding or subtracting a predetermined margin to or from the total distance for which the vehicle has been able to travel in the CD mode. Accordingly, it is possible to adjust as required according to the state of charge of the battery, the driving environments of the vehicle, the driving states of the vehicle, and the vehicle conditions of the vehicle. In any case, the embodiments may be modified as long as the above value is obtained as the first distance.

Each of the above embodiments illustrates a case in which accumulation (sum) of the travel distance for the sections in which the vehicle has been able to travel in the CD mode is obtained as the first distance. However, the distance for EV driving (traveled only by the motor) while the CD mode is set may be obtained as the first distance. By obtaining the first distance as the distance for EV driving in the CD mode, it is possible to obtain the result of extension of the distance for EV driving in the traveling according to the travel plan. The first distance may be obtained as the sum of the travel distance for the sections traveled while the CD mode is set and the distance for EV driving while the CS mode is set, or may be obtained as the sum of the distance for EV driving while the CD mode is set and the distance for EV driving while the CS mode is set. It is also possible to obtain the result of extension of the distance for EV driving in the traveling according to the travel plan by adding the EV driving in the CS mode according to the travel plan to the first distance. In any case, it is possible to obtain, at high accuracy, the actual magnitude of the distance for which the vehicle 100 has been able to travel in the CD mode or in the EV driving, with which the fuel efficiency or the exhaust performance may be improved.

Each of the above embodiments illustrates a case in which the vehicle 100 is a plug-in hybrid vehicle. However, the vehicle may be a hybrid vehicle with an increased charge amount. The present disclosure may be applied to a case in which a travel plan is made for reducing the battery charge amount to a reference value.

The invention claimed is:

1. A vehicular information processing device of a vehicle having an internal combustion engine, a battery and a motor, the vehicular information processing device comprising:
   a memory storing:
      a travel route between a departure place and a destination, the travel route including a plurality of sections, and
      a travel plan identifying one of a first mode or a second mode as a traveling condition of the vehicle for each of the sections in the travel route based on a road load of each section; and
   a processor programmed to:
      select one of: (i) the first mode that restrains or prohibits operation of the internal combustion engine to prioritize an operation of the motor that consumes a charge amount of the battery, or (ii) the second mode that activates at least one of the engine and the motor to maintain the charge amount of the battery,
      obtain a total distance that the vehicle has traveled in the first mode as a first distance based on a result of traveling of the vehicle according to the travel plan,
      estimate a total distance for which the vehicle would have traveled in the first mode on the condition that the vehicle travels with the first mode preferentially assigned to the travel route separately from the travel plan as a second distance, and
      display information corresponding to the first distance and information corresponding to the second distance after the vehicle has traveled, in order to notify a user of a change in distance of the first mode resulting from traveling according to the travel plan.

2. The vehicular information processing device according to claim 1, wherein the processor obtains, as the first distance, a total distance for which the vehicle has traveled only by the motor for sections to which the first mode is assigned by the travel plan.

3. The vehicular information processing device according to claim 1, wherein the processor obtains a distance for which the vehicle has traveled only by the motor for sections to which the second mode is assigned by the travel plan, and obtains a total distance of the obtained distance added to the first distance as a newly obtained first distance.

4. The vehicular information processing device according to claim 1, wherein the processor displays the first distance and the second distance side by side.

5. The vehicular information processing device according to claim 1, wherein the processor notifies a difference between the first distance and the second distance.

6. The vehicular information processing device according to claim 5, wherein the processor divides a range within which the difference varies into a plurality of levels and notifies the difference based on the levels.

7. The vehicular information processing device according to claim 6, wherein the processor determines weighting for each of the levels, and determines a range for each level based on the weighting.

8. The vehicular information processing device according to claim 7, wherein the processor changes the weighting according to at least one of a state of charge of the battery, a driving environment of the vehicle, a driving state of the vehicle, and a condition of the vehicle.

* * * * *